US012091138B1

(12) United States Patent
Matlack

(10) Patent No.: US 12,091,138 B1
(45) Date of Patent: Sep. 17, 2024

(54) AMMONIA BUNKER DELIVERY SYSTEM FOR TRANSFERRING OF AMMONIA BUNKER FUEL

(71) Applicant: Ralph E. Matlack, San Jose, CA (US)

(72) Inventor: Ralph E. Matlack, San Jose, CA (US)

( * ) Notice: Subject to any disclaimer, the term of this patent is extended or adjusted under 35 U.S.C. 154(b) by 29 days.

(21) Appl. No.: 18/121,160

(22) Filed: Mar. 14, 2023

(51) Int. Cl.

| | |
|---|---|
| ***B67D 9/00*** | (2010.01) |
| ***B63B 27/34*** | (2006.01) |
| ***B63B 79/10*** | (2020.01) |
| ***B63B 79/40*** | (2020.01) |

(52) U.S. Cl.
CPC .............. *B63B 27/34* (2013.01); *B63B 79/10* (2020.01); *B63B 79/40* (2020.01); *B67D 9/00* (2013.01)

(58) Field of Classification Search
CPC .................................. B67D 9/00; B63B 27/34
See application file for complete search history.

(56) References Cited

U.S. PATENT DOCUMENTS

| | | | | |
|---|---|---|---|---|
| 4,066,098 | A | 1/1978 | Gallo | |
| 2010/0217536 | A1 | 8/2010 | Casimiro et al. | |
| 2017/0050526 | A1* | 2/2017 | Sommarström | B60L 53/16 |
| 2020/0071155 | A1* | 3/2020 | Schulz | B67D 9/02 |
| 2021/0214051 | A1* | 7/2021 | de Jonge | G06V 20/653 |

FOREIGN PATENT DOCUMENTS

| | | | |
|---|---|---|---|
| CN | 102807165 | B | 10/2014 |
| CN | 110525668 | A | 12/2019 |
| CN | 114368449 | A | 4/2022 |
| EP | 3137961 1 | A | 1/2018 |
| EP | 3153396 | B1 | 12/2018 |
| JP | 2005195193 | A | 7/2005 |
| KR | 101719918 | B1 | 3/2017 |
| KR | 20170069999 | A | 6/2017 |

(Continued)

OTHER PUBLICATIONS

Hongjun Fan, Hossein Enshaei, Shantha Gamini Jayasinghe, Sock Hua Tan, Chunchang Zhang, Quantitative risk assessment for ammonia ship-to-ship bunkering based on Bayesian network. Process Saf Prog. 2022; 41:395-410.

(Continued)

*Primary Examiner* — Jason K Niesz
(74) *Attorney, Agent, or Firm* — Helix Patent Services LLC

(57) ABSTRACT

An ammonia bunker delivery system for transferring of ammonia bunker fuel is disclosed. The The ammonia bunker delivery system comprises a primary bunker arm configured to physically support a fluid delivery system across a first distance between a bunker vessel and a receiving vessel. Further, the ammonia bunker delivery system comprises a secondary bunker arm configured to physically support the fluid delivery system to facilitates a second relative motion between the bunker vessel and the receiving vessel. Further, the ammonia bunker delivery system comprises a motion control system configured to coordinate movements of the primary bunker arm and the secondary bunker arm. The fluid control system comprises a connection assembly configured to make a final connection between the ammonia bunker delivery system and the bunker flange of the receiving vessel based on the sensor input.

22 Claims, 5 Drawing Sheets

(56) References Cited

FOREIGN PATENT DOCUMENTS

| | | | |
|---|---|---|---|
| KR | 101775472 | B1 | 9/2017 |
| NL | 2013384 | B1 | 9/2016 |
| NL | 2014579 | B1 | 1/2017 |
| WO | 2015166287 | A1 | 11/2015 |

OTHER PUBLICATIONS

Dr. James A. Lisnyk; Student Ship Design Competition 2020; 4200 Cubic Meter LNG Bunkering Vessel; Concept Design https://www.sname.org/sites/default/files/2021-01/2020%20Sample%20for%20Entrants.pdf.

Gregory, D, M West, R Paton, R Casimiro, S Boo, Y Low, M Henry, et al. 2008. "Two-Phase Flow Metering Using a Large Coriolis Mass Flow Meter Applied to Ship Fuel Bunkering." Measurement and Control 41 (7): 208-12.

* cited by examiner

300

AMMONIA BUNKER DELIVERY SYSTEM FOR TRANSFERRING OF AMMONIA BUNKER FUEL

FIELD OF INVENTION

Embodiments of the present disclosure relate to a fuel transferring system and more particularly relates to an ammonia bunker delivery system for transferring of ammonia bunker fuel.

BACKGROUND

Fuel oil bunkering is a critical operation on board ships which requires receiving oil safely into the ship's tanks without causing an overflow of oil. In the process of transferring the fuel oil, two adjacent ships are positioned alongside to each other for supply of fuel oil from one ship to another ship. Conventionally, the fuel oil bunkering process is not safe and consumes a lot of time in transferring ammonia bunker fuel from one ship to another. Further, the conventional solutions require manual efforts from crews causing fatigue to the crews. Furthermore, the conventional solutions also possess a huge risk to the crews as it is risky to manually perform the processes associated with the fuel oil bunkering.

Hence, there is a need for an ammonia bunker delivery system for transferring of ammonia bunker fuel, in order to address the aforementioned issues.

BRIEF DESCRIPTION

In accordance with an embodiment of the disclosure, an ammonia bunker delivery system for transferring of ammonia bunker fuel is disclosed. The ammonia bunker delivery system comprises a primary bunker arm configured to physically support a fluid delivery system across a first distance between a bunker vessel and a receiving vessel. The primary bunker arm facilitates a first relative motion between the bunker vessel and the receiving vessel. Further, the primary bunker arm comprises a pedestal configured to provide a plurality of motions via a set of hydraulic actuators. The pedestal is sized to physically support static and dynamic loads from a rest of the ammonia bunker delivery system. The primary bunker arm also includes a knuckle boom attached to an end of a main boom via a pivot joint that facilitates free rotation on a vertical plane. The set of hydraulic actuators are used to rotate the knuckle boom around an axis of the pivot joint connection with a main boom. Furthermore, the ammonia bunker delivery system comprises a secondary bunker arm configured to physically support the fluid delivery system to facilitates a second relative motion between the bunker vessel and the receiving vessel. The secondary bunker arm is configured to make a physical connection to a bunker flange of the receiving vessel. The secondary bunker arm comprises a manipulator arm configured to be used in an outdoor and marine environment. The manipulator arm corresponds to a standard 6-axis industrial robotic arm. Further, the secondary bunker arm comprises a tool interface attached to a wrist end of the manipulator arm via a plurality of bolts. The tool interface is configured to provide a mechanical connection to a connection assembly. Further, the ammonia bunker delivery system comprises a motion control system configured to coordinate movements of the primary bunker arm and the secondary bunker arm. The motion control system comprises a connection sensor array comprising two sets of sensors mounted on opposite sides of each other at a hose-end of the connection assembly. The two sets of sensors are configured to determine a precise position of the bunker flange relative to the connection assembly. The two sets of sensors are connected to motion controllers via a set of fiber optic cables. The motion control system also comprises a primary motion controller comprising a set of computers configured to model an environment associated with the bunker vessel, the bunker delivery system, and the receiving vessel based on sensor input captured by a plurality of sensor arrays and the determined precise position. The primary controller is configured to determine an optimal position a set of elements of the ammonia bunker delivery system, and send signals to all actuators of the ammonia bunker delivery system for moving the set of elements based on a result of modelling the environment. Furthermore, the ammonia bunker delivery system also comprises a fluid control system configured to contain and control a flow of ammonia bunker fuel from the bunker vessel to the receiving vessel. The fluid control system comprises a connection assembly configured to make a final connection between the ammonia bunker delivery system and the bunker flange of the receiving vessel based on the sensor input.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Figure 1A:
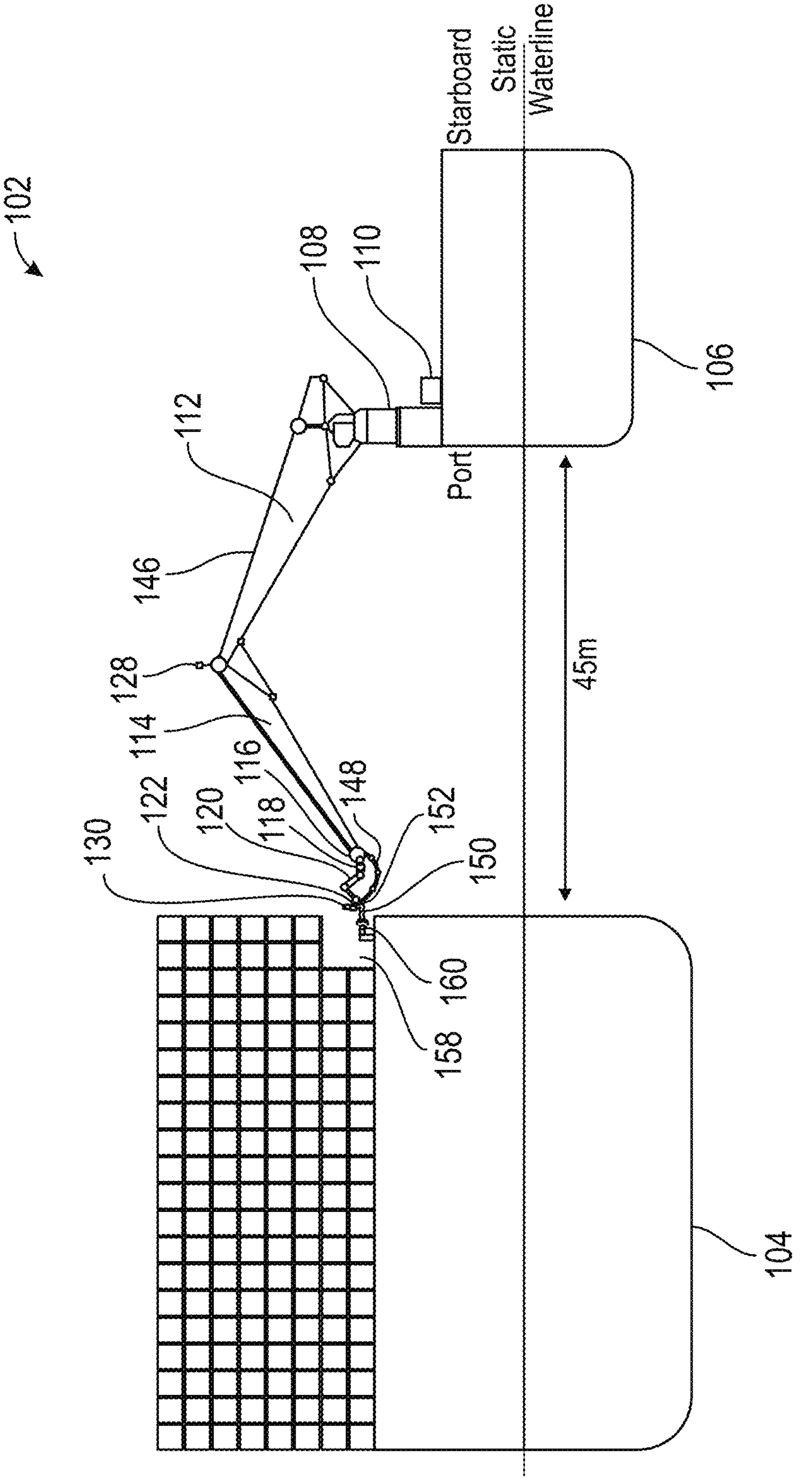
FIG. 1A is a sectional view of an ammonia bunker delivery system for transferring of ammonia bunker fuel, in accordance with an embodiment of the present disclosure.
Figure 1B:
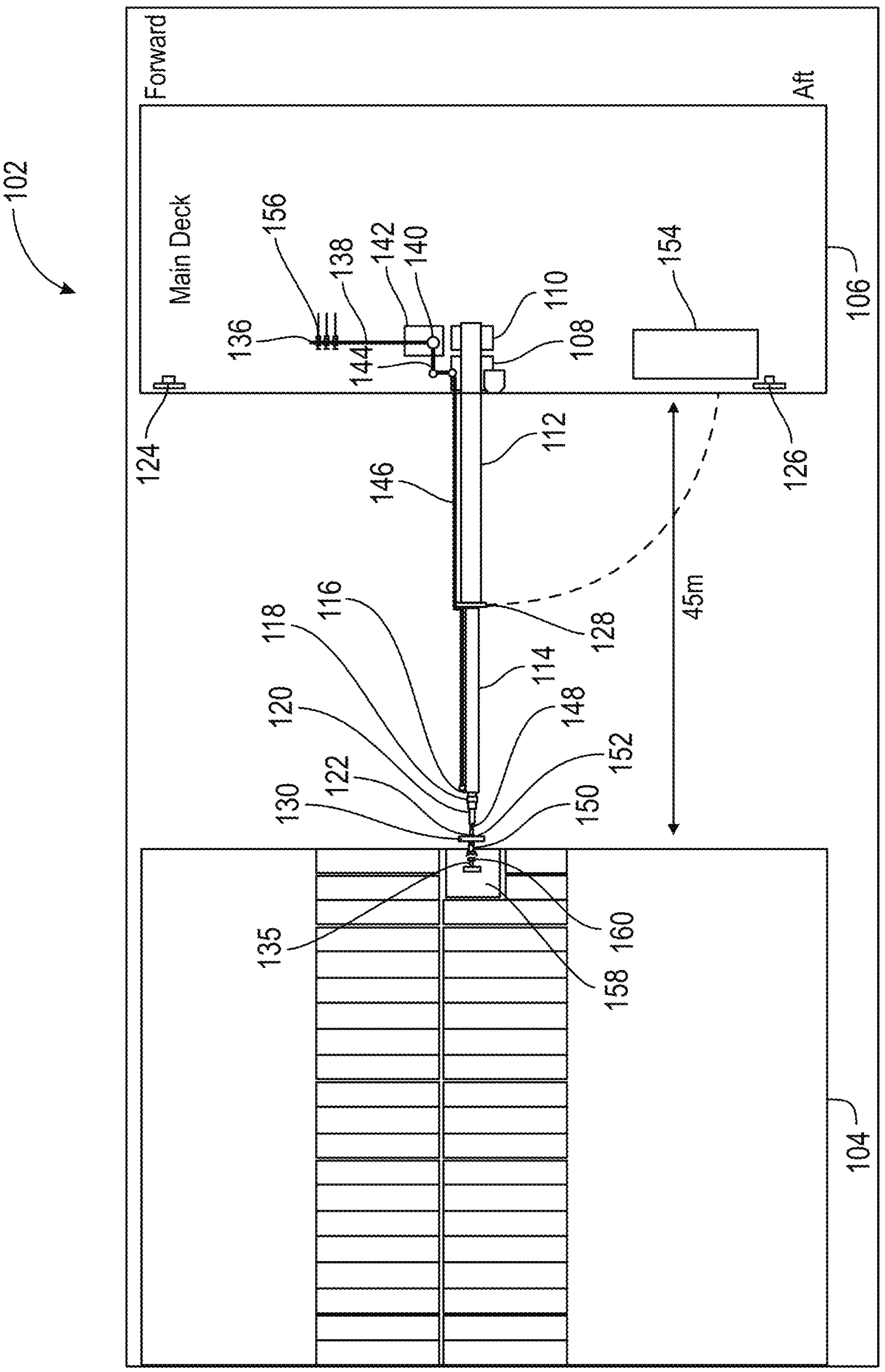
FIG. 1B is a plan view of the ammonia bunker delivery system for transferring of the ammonia bunker fuel, in accordance with another embodiment of the present disclosure.

FIG. 1A is a sectional view of an ammonia bunker delivery system for transferring of ammonia bunker fuel, in accordance with an embodiment of the present disclosure. Further, FIG. 1B is a plan view of the ammonia bunker delivery system for transferring of the ammonia bunker fuel, in accordance with another embodiment of the present disclosure. For the sake of brevity, FIG. 1A and FIG. 1B have been explained together.

In an embodiment of the present disclosure, the ammonia bunker delivery system 102 comprises a primary bunker arm configured to physically support a fluid delivery system across a first distance between a bunker vessel 104 and a receiving vessel 106. The primary bunker arm facilitates a first relative motion between the bunker vessel 104 and the receiving vessel 106. The first relative motion facilitates majority of the motion between the bunker vessel 104 and the receiving vessel 106. In an embodiment of the present disclosure, the fluid delivery system corresponds to one or more pipes used to transfer ammonia bunker fuel. The design and function of the primary bunker arm is based on an existing motion compensating crane. For example, the cranes may be BM-T40 from Barge Master and lines from SMST and MacGregor.

Further, the primary bunker fuel comprises a pedestal 108 configured to provide a plurality of motions via a set of hydraulic actuators. In an embodiment of the present disclosure, the pedestal 108 is made of steel and is securely attached to a deck structure of the bunkering vessel. In an exemplary embodiment of the present disclosure, the plurality of motions corresponds to a 3-axis motion compensation including rill, pitch and heave. The pedestal 108 is sized to physically support static and dynamic loads from a rest of the ammonia bunker delivery system 102.

Furthermore, the primary bunker arm includes a Hydraulic Power Unit (HPU) 110 securely attached to a deck structure of the bunkering vessel adjacent to the pedestal 108. The HPU 110 uses a marine-grade material and is configured to supply hydraulic power to the primary bunker arm. In an embodiment of the present disclosure, the HPU 110 is driven by a set of electric pumps. The set of electric pumps receive power from a grid of the bunker vessel 104 and backed-up by a set of emergency batteries associated with a safety system.

In an embodiment of the present disclosure, the primary bunker arm includes the main boom 112 attached to the pedestal 108 via a joint point that facilitates free rotation on a vertical plane. In an exemplary embodiment of the present disclosure, the main boom 112 is made of steel. The set of hydraulic actuators are used to rotate the main boom 112 around an axis of a pivot joint connection with the pedestal 108.

Further, the primary bunker arm includes a knuckle boom 114 attached to an end of a main boom 112 via a pivot joint that facilitates free rotation on a vertical plane. In an embodiment of the present disclosure, the set of hydraulic actuators are used to rotate the knuckle boom 114 around an axis of the pivot joint connection with a main boom 112. In an exemplary embodiment of the present disclosure, the knuckle boom 114 is made of steel.

Furthermore, the primary bunker arm includes a primary wrist 116 attached to an end of the knuckle boom 114 via a pivot joint that facilitates a free rotation on the vertical plane. The primary arm is made of steel. In an embodiment of the present disclosure, the set of hydraulic actuators are used to rotate the primary wrist 116 around the axis of the pivot joint connection with the knuckle boom 114. In an exemplary embodiment of the present disclosure, the primary wrist 116 corresponds to a short boom segment configured to orient a secondary arm interface 118.

The primary arm includes a secondary arm interface 118 attached to an end of a primary wrist 116 via the plurality of bolts. In an exemplary embodiment of the present disclosure, the secondary arm interface 118 is made of steel and marine-grade materials. In an embodiment of the present disclosure, the secondary arm interface 118 provides mechanical, electrical, and hydraulic connections to the secondary bunker arm.

In an embodiment of the present disclosure, the primary bunker arm is designed to support the secondary bunker arm i.e., nearly 3,000 kg, the connection hose segment 148 i.e., nearly 200 kg, and the connection assembly 150 i.e., nearly 200 kg at a maximum outreach of 45 meters under static and dynamic loads. Further, structural material used in the entire primary bunker arm is of high strength to minimize weight and suitable for low temperature liquids. For example, the structural material may be A537 Grade B Carbon Steel.

Further, the ammonia bunker delivery system 102 includes a secondary bunker arm configured to physically support the fluid delivery system to facilitates a second relative motion between the bunker vessel 104 and the receiving vessel 106. The secondary bunker arm is configured to make a physical connection to a bunker flange of the receiving vessel 106. In an embodiment of the present disclosure, the first distance is more as compared to the second distance. Further, the second relative motion facilitates a remaining motion between the bunker vessel 104 and the receiving vessel 106.

In an embodiment of the present disclosure, the design and function of the secondary bunker arm is based on existing industrial robot arms. For example, these robot arms are KR FORTEC ultra from Kuka, the UP400RD II from Yaskawa, and the IRB 8700 from ABB.

The secondary bunker arm includes a manipulator arm 120 configured to be used in an outdoor and marine environment, such as IP67. In an embodiment of the present disclosure, the manipulator arm 120 corresponds to a standard 6-axis industrial robotic arm.

Further, the secondary arm includes a tool interface 122 attached to a wrist end of the manipulator arm 120 via the plurality of bolts. In an exemplary embodiment of the present disclosure, the tool interface 122 is made of the steel and the marine-grade material. In an embodiment of the present disclosure, the tool interface 122 is configured to provide a mechanical connection to a connection assembly 150.

In an embodiment of the present disclosure, the secondary bunker arm is designed to support the connection hose segment 148 i.e., nearly 200 kg and the connection assembly 150 i.e., nearly 200 kg at a maximum outreach of 4 meters under static and dynamic loads. Further, the secondary bunker arm is having the ability to hold the connection assembly 150 within +/−5 mm relative to the bunker flange when operating within the overall system's operational envelope. When connected via the connection assembly 150 to the bunker flange, the secondary bunker arm may support the connection assembly 150, such that the secondary bunker arm exerts no more than 200 newtons of axial force, no more than 200 Newtons of sheer force, and no more than 200 newton-meters of torsion force on the bunker flange.

Furthermore, the ammonia bunker delivery system 102 includes a motion control system configured to coordinate movements of the primary bunker arm and the secondary bunker arm. In an embodiment of the present disclosure, the motion control system includes the plurality of sensor arrays positioned on the bunker vessel 104 and the bunker arm configured to create a detailed and real-time digital model of a physical environment inclusive of the bunker vessel 104, the ammonia bunker delivery system 102, and the receiving vessel 106. Further, a set of programs use the created detailed and real-time digital model to orchestrate a movement of the primary bunker arm and the secondary bunker arm to reduce a relative motion between the connection assembly 150 and the bunker flange to within 5 mm.

In an embodiment of the present disclosure, overall motion control is accomplished via the dynamic position system of the bunker vessel including three of the aforementioned-components working in collaboration. The bunkering vessel is assumed to be equipped with a dynamic positioning system capable of target-following (example: Kongsberg). Therefore, the bunker vessel's DP system provides the first tier of motion compensation by controlling the position of the bunker vessel in the horizontal plane (i.e. surge, sway and yaw) relative to the receiving vessel. Further, the relative position keeping capability is expected to be +/−3 degrees of yaw and +/−5 meters of surge and sway.

Further, the Pedestal provides motion compensation on three additional axes (pitch, roll, and heave). Conventionally available motion compensating pedestals installed on offshore supply vessels can typically compensate for motions between the vessel and a fixed platform in conditions with a significant wave height of up to 3 meters and wave periods between 4-18 seconds.

Furthermore, the primary bunker arm provides motion compensation on three axes (roll, sway, and heave) via articulation of the main boom, knuckle boom 114, and primary wrist 116 at their respective joints and partial compensation for surge and yaw via slewing of the pedestal turret. The design objective is for the first three tiers of motion compensation (i.e. DP vessel, pedestal, primary bunker arm) to be capable of maintaining the position of the secondary arm interface relative to the receiving vessel's bunker flange within +/−1.0 meters at significant wave heights in head or following seas up to 4 meters.

Further, the secondary bunker arm provides the fourth and final tier of motion compensation and may have a range of movement on all six axes with high precision. In an embodiment of the present disclosure, the design operating envelope is explained in further paragraphs by using FIG. 2.

In an embodiment of the present disclosure, the plurality of sensor arrays includes a forward sensor array 124, an aft sensor array 126, the primary arm sensor array 128, and a connection sensor array 130. The forward sensor array 124 includes a set of sensors mounted on a mast that is attached to a deck structure of the bunker vessel 104 30 m forward of the bunker arm pedestal 108. In an embodiment of the present disclosure, the set of sensors are connected to the motion controllers via fiber optic cables. In an exemplary embodiment of the present disclosure, the set of sensors include cameras, radar, LIDAR, and the like.

Further, the aft sensor array 126 includes the set of sensors mounted on a mast that is attached to the deck structure of the bunker vessel 104 30 m aft of the bunker arm pedestal 108. In an embodiment of the present disclosure, the set of sensors are connected to the motion controllers via the fiber optic cables.

In an embodiment of the present disclosure, the primary bunker includes a pedestal turret located atop the pedestal. The pedestal turret facilitates rotation on the horizontal plane (i.e. slewing) driven by redundant hydraulic worm gear drives. Further, the pedestal Turret incorporates an enclosure and controls for manual operation of the primary bunker arm. However, the primary bunker arm may be operated remotely during normal operations.

Furthermore, the primary arm sensor array 128 includes the set of sensors mounted on a short base that is attached to the end of the main boom 112 above the pivot joint, and wherein the set of sensors are connected to the motion controllers via the fiber optic cables.

In an embodiment of the present disclosure, the connection sensor array 130 includes two sets of sensors mounted on opposite sides of each other at a hose-end of the connection assembly 150. The two sets of sensors are configured to determine a precise position of the bunker flange relative to the connection assembly 150. In an exemplary embodiment of the present disclosure, the set of sensors include cameras, radar, LIDAR, and the like. In an embodiment of the present disclosure, the two sets of sensors are connected to motion controllers via a set of fiber optic cables.

Further, the motion control system includes a primary motion controller 132 physically located on the bridge of the bunker vessel 104. In an embodiment of the present disclosure, the primary motion controller 132 includes a set of computers configured to model an environment associated with the bunker vessel 104, the bunker delivery system, and the receiving vessel 106 based on sensor input captured by a plurality of sensor arrays and the determined precise position. Furthermore, the primary controller is configured to determine an optimal position a set of elements of the ammonia bunker delivery system 102, and send signals to all actuators of the ammonia bunker delivery system 102 for moving the set of elements based on a result of modeling the environment.

Furthermore, the motion control system includes a secondary motion controller 134 configured to serves as a backup to the primary motion controller 132. The secondary motion controller 134 is identical to the primary motion controller 132. In an embodiment of the present disclosure, the second motion controller is physically located in a garage 154.

In an embodiment of the present disclosure, the motion control system includes a receptor assembly 135 consisting of a set of laser reflectors, radar reflectors, visual targets, accelerometers, wireless transmitter, and a connection receptacle for hardwire communications. The receptor assembly 135 is securely clamped to the receiving vessel's bunker flange and provides a clean target for the bunker vessel's sensors to reference. Further, the accelerometers in the receptor assembly 135 accurately record the motion of the bunker flange before and during connection and transmit this data to the bunker vessel's motion control system via the wireless transmitter. Furthermore, the connection receptacles provide a hardwire (fiber optic) connection between the receiving vessel's and bunker vessel's ESD systems.

Further, in addition to modelling the current environment and controlling the real-time motions of the overall system, one or more programs running on the motion controller may also model the predicted future relative motions of the vessels. The predictive model may be used in two ways. Firstly, the predictive model may be used to refine and smooth the movement of the overall system. Secondly, the predictive model may be used to proactively trigger an emergency shutdown. For example, when the predictive model indicates that the probability of exceeding the operating envelope is over a certain limit, an emergency shutdown may be initiated before the operating envelope is actually exceeded.

The ammonia bunker delivery system 102 includes a fluid control system configured to contain and control a flow of ammonia bunker fuel from the bunker vessel 104 to the receiving vessel 106. In an embodiment of the present disclosure, the fluid control system includes a plurality of pipes, a set of hoses, a plurality of valves, a plurality of pumps that connect the bunker vessel 104's cargo manifold 156 to a receiving ship's bunker flange. The ammonia bunker delivery system 102 is designed to operate downstream of the bunker vessel 104's cargo manifold 156 for allowing the bunker delivery system to leverage existing capabilities of an ammonia carrier with respect to cargo transfer. In an embodiment of the present disclosure, the ammonia bunker delivery system 102 augments this capability as required i.e., a supplemental booster pump.

In an embodiment of the present disclosure, the material used for the pipe, fittings, and valves may be suitable for low temperature liquids (including anhydrous ammonia). For example, ASTM A333 Grade 6 Steel pipe, with ASTM A420 Grade WPL-6 fittings, and ASTM A352 Grade LCC valves.

Figure 4:
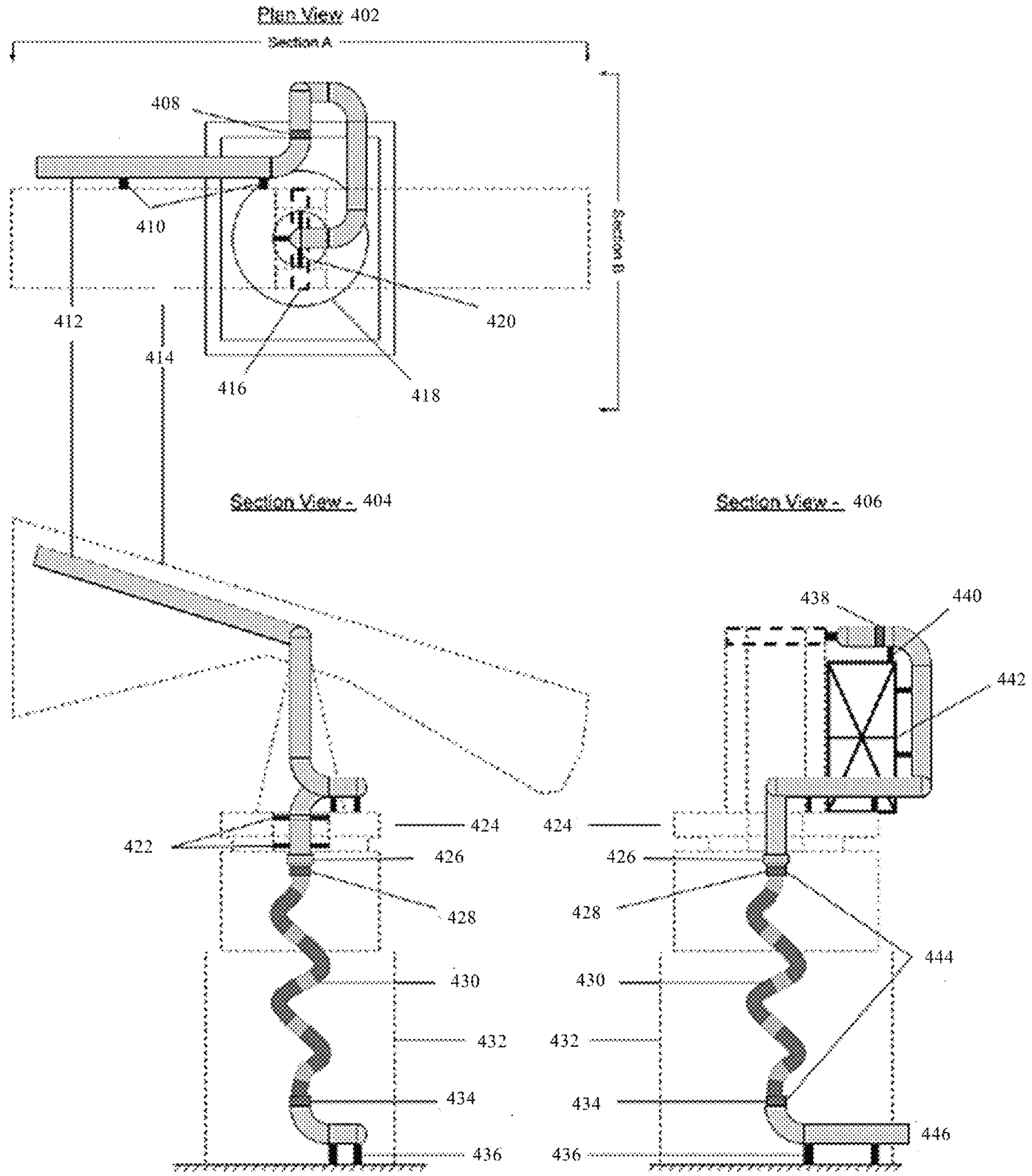
FIG. 4 is a schematic diagram of a bunker supply pipe and hose detail at pedestal and boom, in accordance with an embodiment of the present disclosure.

Further, all bunker supply pipes may be double-wall vacuum jacketed and designed for dual containment. That is, the outer jacket may be sized to withstand the full system design pressure and temperature. As depicted in FIG. 4, pressure measurement and gas detection instrumentation may be provided for both the inner supply pipe and the outer annulus. In an embodiment of the present disclosure, the vacuum jacketed piping is primarily used to provide an extra layer of protection by helping contain internal leaks and by helping shield the inner pipe from the external damage. However, additional benefits include faster cool down time, lower thermal loss during transfer, and higher durability relative to single wall, insulated pipes.

In an embodiment of the present disclosure, the fluid control system includes a bunker delivery manifold 136, a deck supply pipe 138, one or more booster pumps 140, a bunker supply preparation room 142, a supply hose segment 144, a boom supply pipe 146, a connection hose management and the connection assembly 150. The bunker delivery manifold 136 is a steel pipe and valve assembly designed as an additional attachment to the bunker vessel 104's existing cargo manifold 156. Further, the bunker delivery manifold 136 is attached to each of the bunker vessel 104's cargo manifold flanges via the set of bolts and supported by insulated steel supports attached to the deck structure. In an embodiment of the present disclosure, a valve at each cargo flange connection routes the fluid into one of the ammonia bunker delivery system 102 or straight through to a secondary cargo flange. Further, each segment of the bunker delivery manifold 136 connects to a cargo flange may have a corresponding pass-through to a secondary cargo flange and a branch to the deck supply pipe. Furthermore, valves are located to allow isolation of the secondary cargo flanges during bunkering operations and isolation of the bunker delivery system during cargo operations. The valves are locked closed to prevent inadvertent opening while cargo or bunkering operations are underway.

Further, the deck supply pipe 138 is a double-walled steel pipe connecting the bunker delivery manifold 136 to the one or more booster pumps 140. In an embodiment of the present disclosure, the deck supply pipe is a section of the pipe connecting the bunker delivery manifold to the equipment in the bunker supply preparation rooms. In an embodiment of the present disclosure, the pipe is sized to support the maximum bunkering rate of prospective receiving vessel 106. The pipe is supported by insulated steel supports attached to the deck structure.

The one or more booster pumps 140 are provided to augment the bunker vessel 104's cargo pumps as required. Furthermore, the one or more booster pumps 140 is sized to support the maximum bunkering rate of prospective receiving vessel 106. Further, piping and valves within the bunker supply preparation room may allow the one or more booster pumps to be isolated and bypassed when not in use. The booster pumps may be driven by certified safe electric motors located adjacent to the pumps.

Furthermore, the bunker supply preparation room 142 provides an enclosed space for housing and maintaining the one or more booster pumps 140 and an additional equipment. In an embodiment of the present disclosure, the additional equipment includes emergency shutoff valves, mass flowmeters, and sampling valves. The fire booster pump is also located in this space. In an embodiment of the present disclosure, the space may be designed to meet or exceed the requirements set forth in the IGC and SOLAS (II-2/9.2.4 and II-2/4.5.10). The design and safety features for the enclosed space are similar to features of fuel preparation rooms for ammonia-fueled vessels.

Further, the supply hose segment 144 is a flexible length of hose connecting a rigid piping inside the bunker supply preparation room 142 with the ship-end of a boom supply pipe 146 located at the top of the pedestal 108. In an embodiment of the present disclosure, the hose is flexible to accommodate the relative motion between the pedestal 108 and the equipment fixed to the deck structure of the bunker vessel 104 as well as rotation of the turret. In an embodiment of the present disclosure, the swivel joints at both ends of the supply hose segment alleviate torsion stress on the hose. A diagram depicting this arrangement is provided in FIG. 4.

The hose is suitable for transferring liquid ammonia at up to 25 bar (Example: COMPOTEC CRYOTEC 660).

Furthermore, the boom supply pipe 146 is a double-walled steel pipe connecting the supply hose segment 144 to the connection hose segment 148. In an embodiment of the present disclosure, the boom supply pipe 146 is physically supported by the main boom 112 and the knuckle boom structures. Further, a set of swivel joints are located at pivot points on the bunker arm to facilitate the boom supply pipe 146 to articulate with the bunker arm's movement. In an embodiment of the present disclosure, the location of swivel joints is depicted in FIG. 4. Swivel joints may use twin tracks of bearings and use low temperature rated steel. For example: Emco Wheaton D1010. Further, the pipe supports attaching the boom supply pipe to the boom structure may be insulated to help provide thermal isolation of the pipe and fuel being transferred.

Figure 3:
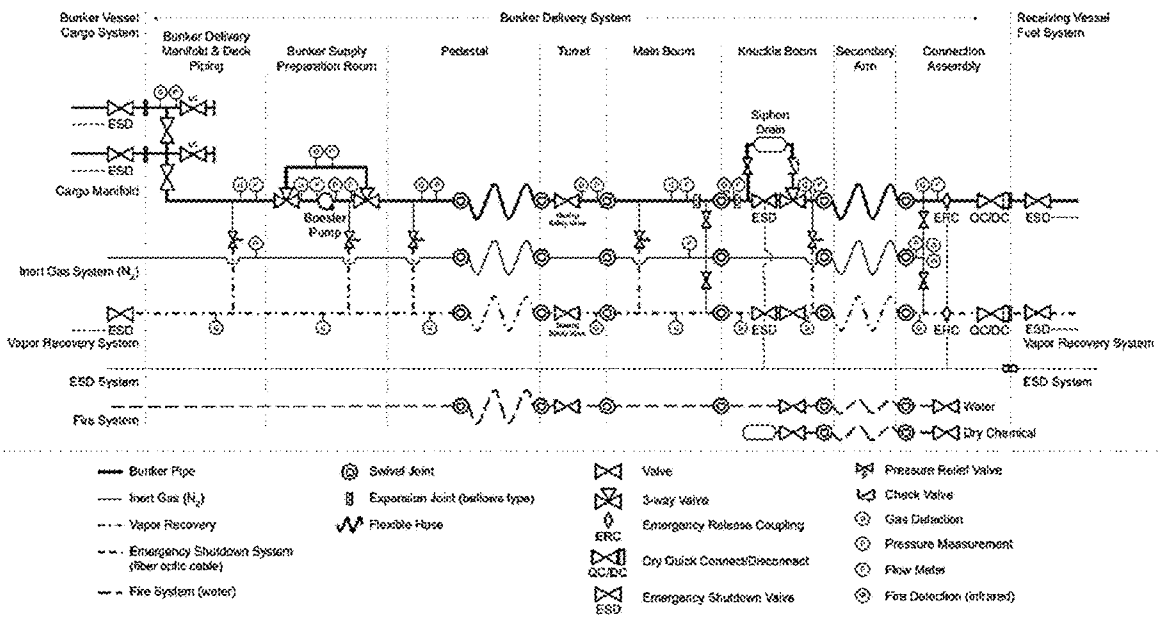
FIG. 3 is a logical schematic diagram of a fluid control system, in accordance with an embodiment of the present disclosure.

In an embodiment of the present disclosure, the fluid control system includes a supply line for inert gas (Nitrogen) may run parallel to the boom supply pipe to supply inert gas for purging. Inert gas for the bunker delivery system may be supplied by the bunker vessel's inert gas generation plant. The logical design and location of connections and valves are depicted in FIG. 3. For simplicity, the inert gas supply line is not shown in FIG. 4. However, a similar design and path can be used as the bunker supply line.

Further, the fluid control system includes a vapor recovery line to connect the bunker vessel's cargo vapor recovery system with the receiving vessel's fuel vapor recovery system. The logical design and location of connections and valves are depicted in FIG. 3. For simplicity, the vapor recovery line is not shown in FIG. 4. However, a similar design and path may be used as the bunker supply line. The fluid control system also includes a valve located near the outboard end of the knuckle boom 114 to serve as a secondary ESD valve. This valve is provided to offer redundancy of the primary ESD valve at the cargo manifold and to help mitigate surge pressure on ESD activation.

Furthermore, the fluid control system includes a valve located at the base of the pedestal turret designed and configured to physically close whenever the turret and boom are slewed back towards the stowing position. This is meant to further ensure that no liquid or vapor from the cargo system can physically flow to the bunker arm when it is in its stowed position.

The connection hose segment 148 is a flexible length of hose connecting the boom-end of the boom supply pipe 146 with the connection assembly 150. In an embodiment of the present disclosure, the hose is flexible to accommodate the full range of motion of the secondary bunker arm. The hose is suitable for transferring liquid ammonia at up to 25 bar (Example: COMPOTEC CRYOTEC 660).

In an embodiment of the present disclosure, the connection assembly 150 is configured to make a final connection between the ammonia bunker delivery system 102 and the bunker flange of the receiving vessel 106 based on the sensor input. In an embodiment of the present disclosure, the connection assembly 150 of a set of sizes is available and is fitted based on the receiving vessel 106 specifications. In an embodiment of the present disclosure, the connection assembly 150 includes an adapter, an Emergency Release Coupling (ERC), a mass flowmeter, and a hydraulic QC/DC.

The adapter adapts a size of the connection hose segment 148 to the size of the bunker flange. Further, the ERC coupling is calibrated to automatically separate when allowable stress is exceeded and cutting off fluid flow on both sides of the coupling. For example, emergency release coupler from SVT GmbH. Furthermore, the mass flowmeter is for accurate measurement of the quantity of fuel delivered. In an embodiment of the present disclosure, the hydraulically powered dry quick connect/disconnect is for making a secure and remotely activated connection to the bunker flange.

Further, the fluid control system includes a siphon drain. The siphon drain is a sub-system responsible for collecting any trapped liquid and vapor volume between the control valve at the end of the knuckle boom 114 and the receiving vessel's bunker manifold valve. The siphon drain includes a containment vessel, hydraulically powered vacuum pump, and associated piping and valves and is physically located near the outboard end of the knuckle boom 114.

In order to expedite the bunkering process and simplify coordination with the receiving vessel 106, the system is designed to handle all of the draining and purging of all volume outboard of the receiving vessel's bunker manifold valve. Accordingly, the actions and responsibility for making a safe disconnection rest with the bunkering vessel. The receiving vessel 106 is then only responsible for draining and purging its own bunker manifold. Further, the system is designed to allow draining and purging of the volume between the control valve at the end of the knuckle boom 114 and the receiving vessel's bunker manifold valve rapidly, such that a safe disconnection can be made within 5-10 seconds after all valves are closed.

In an embodiment of the present disclosure, the ammonia bunker delivery system 102 includes a safety system configured to augment the safety features built into other systems and provide an active mitigation in the event of ammonia release. The safety system includes a connection water nozzle 152 which is a remotely operated, variable jet nozzle capable of creating a wide mist curtain or directed stream of water. In an event of emergency release or upon detection of unsafe levels of ammonia, the mist curtain mode is automatically activated. In an embodiment of the present disclosure, water is supplied via a hose and pipe systems running parallel to the hoses and piping of the fluid control system.

Further, the connection water spray system includes four sets of remotely operated water spray nozzles. The first two sets of nozzles are located on both sides (left and right) of the connection assembly 150. The second two sets of nozzles are located on both sides (left and right) of the primary wrist 116. Further, water for the spray system is supplied by the bunker vessel's main fire system via pipes and hoses following a similar path and arrangement as the fluid control system. The sets of nozzles at the connection assembly 150 and the primary wrist 116 may be supplied by separate supply lines running on opposite sides of the bunker arm. In the event of an emergency breakaway upon detection of fire or upon detection of unsafe levels of ammonia in the connection area, the system may automatically activate and create spheres of mist capable of enveloping the bunker station, connection area, secondary arm area, and the outboard portion of the knuckle boom 114.

In an embodiment of the present disclosure, the safety system includes a connection fire suppression system that uses a dry chemical powder as the fire suppression medium and compressed nitrogen gas as the propellant. Further, tanks for the dry chemical powder and compressed nitrogen are located near the outboard end of the knuckle boom and connected to the connection assembly 150 via flexible hoses. Furthermore, two nozzles on the connection assembly 150 direct powder towards the connection area and a bunker station 158.

Furthermore, the safety system includes a fire booster pump. The fire booster pump is an electrically driven centrifugal pump provided as a safeguard in case of low or loss of pressure from the bunker vessel's main fire system. The fire booster pump may be located in the bunker supply preparation room.

The safety system further includes a set of emergency batteries to provide backup power to the bunker delivery system 102 in the event of loss or interruption in power from the bunker vessel's main grid. The set of emergency batteries may be sized to be able to provide full power to the bunker delivery system's hydraulics, sensors, and fire booster pump for at least 30 minutes. Further, the set of emergency batteries and associated switchboard may be located in a dedicated enclosure adjacent to the HPU 110.

Further, the ammonia bunker delivery includes a garage 154 to provides a sheltered space for storing and maintaining the secondary bunker arm and connection assemblies when not in use.

In an embodiment of the present disclosure, a set of sliding doors at the forward end of the garage 154 is open to allow the secondary bunker arm and attached connection assembly 150 to be positioned inside the garage 154. When the set of sliding doors are closed, the set of sliding doors provide a weather-tight seal at the primary wrist 116 of the bunker arm. In an embodiment of the present disclosure, a maintenance is performed on the secondary bunker arm and the connection assembly 150 without the requirement to remove the secondary bunker arm and the connection assembly 150 from the primary bunker arm. In an embodiment of the present disclosure, the space is designated as a cargo machinery space and is designed to meet or exceed the requirements set forth in the IGC (Section 3.3) and SOLAS (II-2/9.2.4 and II-2/4.5.10).

In another embodiment of the present disclosure, the bunker vessel 104 includes a cargo manifold 156. Further, the receiving vessel 106 includes a bunker station 158 and one or more bunker flanges 160 i.e., the bunker vessel 104's one or more bunker flanges 160 for receiving the ammonia bunker fuel. Further, the receiving vessel 106 includes an RV bunker manifold ESD valve and an RV ESD interface. The RV bunker manifold ESD valve is located on the bunker manifold inboard of the bunker flange. Further, the TV ESD interface is a fibre optic connection interface to the receiving vessel's ESD system.

In operation, the transfer of bunker fuel is stopped either by normal operating procedure or by ESD initiation. Further, the valves at the receiving vessel's bunker manifold and at the outboard end of the system's knuckle boom are confirmed closed. Furthermore, the siphon drain sub-system is activated by opening the inlet valve to the siphon drain at the outboard end of the knuckle boom, and simultaneously opening the inert gas injection valve at the connection assembly 150. When the siphon drain sub-system fails, the system may use traditional means of draining and purging (e.g. using nitrogen injected at the main boom/knuckle boom joint to drain and purge liquid through the receiving vessel's bunker manifold). Further, liquid and vapor is removed from the pipe and hose section between the receiving vessel's bunker manifold valve and the last closed valve on the knuckle boom via a combination of the pressure differential between the siphon drain sub-system's containment vessel and the bunker supply pipe/hose segment, and the pressurized inert gas (N2) injected at the connection assembly.

Further, a check valve at the inlet to the siphon drain system ensures no liquid or vapor backflow into the bunker supply hose/pipe segment. Furthermore, once pressure is nearly equalized between the inert gas injection line and the siphon drain, the inert gas valve and siphon drain valve are both closed. The system may be sized, such that the siphon drain may accept enough liquid, ammonia vapor, and inert gas. The siphon drain may accept enough liquid, ammonia vapor, and inert gas, such that concentrations of ammonia within the bunker supply pipe/hose segment are reduced to safe limits (a rough estimate is approximately five times the volume of the bunker supply pipe/hose segment). Furthermore, the measurement of the gas in the bunker supply pipe/hose segment is made to confirm that the concentration of ammonia vapor is within safe limits. If the concentration of ammonia vapor is not within the safe limits, the receiving vessel's bunker manifold valves may be opened, additional inert gas may be injected at the connection assembly, and vapor may be purged to the receiving vessel until a safe limit is reached.

Furthermore, the hydraulic QC/DC disconnects from the receiving vessel's bunker flange and the bunker arm is retracted. In an embodiment of the present disclosure, draining and purging of the remainder of the system including the siphon drain may be done by raising the bunker arm, such that the primary wrist 116 is at the apex and forcing liquid and vapor contents back to the bunker vessel's cargo tanks via the force of gravity and inert gas injection.

Figure 2:
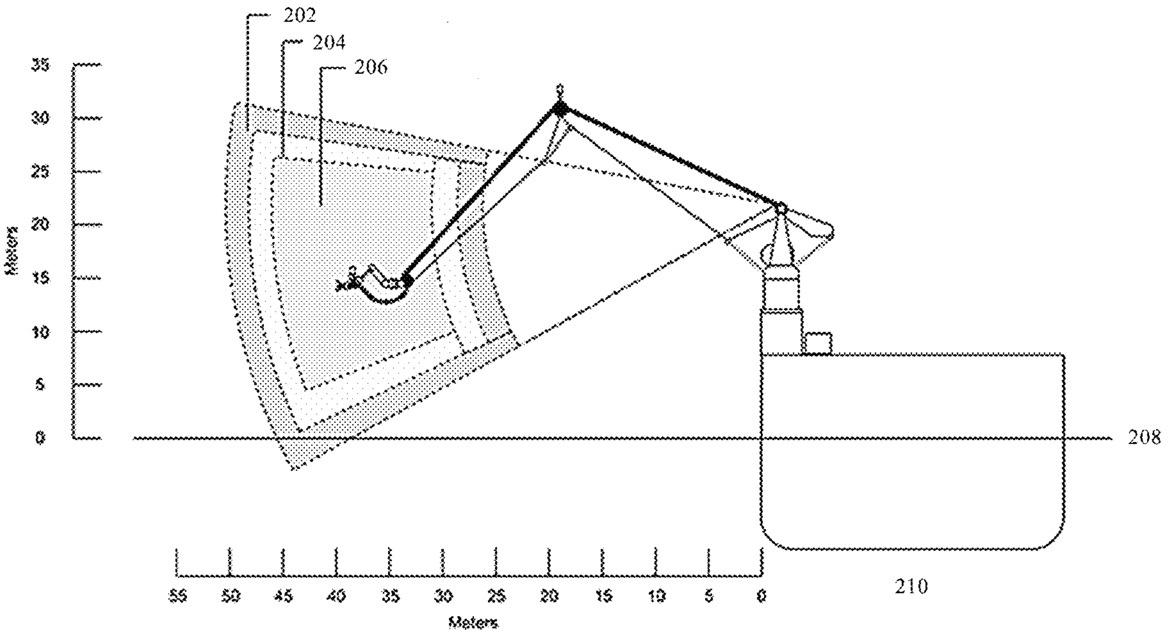
FIG. 2 is a plan view of an operative envelope, in accordance with an embodiment of the present disclosure.

FIG. 2 is a plan view of an operative envelope, in accordance with an embodiment of the present disclosure.

As depicted, 202 represents an emergency disconnection envelope, 204 represents an emergency shutdown envelope, and 206 represents the operating envelope, 208 represents a static waterline, and 210 represents a bunker vessel.

FIG. 3 is a logical schematic diagram 300 of a fluid control system, in accordance with an embodiment of the present disclosure.

As depicted, the logical schematic diagram includes the bunker vessel cargo system, the bunker delivery manifold and deck piping, the bunker supply preparation room, the pedestal, the turret, the main boom, the knuckle boom, the secondary arm, the connection assembly, the receiving vessel fuel system, and the like.

FIG. 4 is a schematic diagram of a bunker supply pipe and hose detail at pedestal and boom, in accordance with an embodiment of the present disclosure.

As depicted, 402 represents a plan view, 404 represents a section view, and 406 represents another section view. 408 represents the swivel joint aligned with axis of the main boom pivot joint. Further, 410 represents pipe supports. 412 represents boom supply pipe, 414 represents the main boom, 416 represents the main boom pivot, 418 represents the sewing turntable with open centre, and 420 represents the pipe supports attached to rotating turret.

Further, 422 represents the pipe supports of the section view, 424 represents the pedestal turret, 426 represents the slewing safety valve, 428 represents the swivel joint aligned with slewing axis, 430 represents the supply hose segment in helical arrangement, 432 represents the pedestal, and 434 the swivel joint along with the sewed axis, and 436 represents the pipe supports.

Furthermore, 438 represents the swivel joint aligned with axis of the main boom pivot joint. 440 represents the pipe supports, 442 represents the pipe support structure, 444 represents the swivel joints aligned with slewing axis, and 446 represents to bunker supply preparation room.

In operation, the preparation starts at least one week prior to first bunker delivery. The compatibility of the receiving vessel with the bunker delivery system may be assessed and confirmed. Further, during installation, the receptor assembly may be delivered to the receiving vessel and a test installation/removal may occur to confirm readiness. During training, the receiving vessel's crew may be trained on the bunker delivery procedure. Further, upon receipt of a request for services, a preliminary plan may be developed and agreed to. This plan may be based on the receiving vessel's existing voyage plan, anticipated conditions in the relevant delivery region(s), and other factors. The plan may include a proposed location for intercept, a detailed timeline of the operation, and responsibilities of the respective vessels. Furthermore, it may be confirmed that no modifications have been made to the receiving vessel's bunker system. At least 8 hours prior to intercept, the receiving vessel may install the receptor assembly on the bunker manifold and activate the transmitter. Motion telemetry of the receiving vessel's bunker flange may begin being transmitted to system and the bunker vessel's motion controller. Further, nearly 4 hours prior to intercept a final bunkering plan may be developed and agreed to. This plan may modify the preliminary plan, if needed, based on anticipated conditions and actual ship motions. Within approximately 5 nm, the bunker vessel may begin roughly matching the course and speed of the receiving vessel and may slowly close the distance. In an embodiment of the present disclosure, acquisition or lock is done. The connection may be physical connection or connection testing.

In an exemplary embodiment of the present disclosure, the emergency operations may be emergency shutdown, stop pumps, close valves on delivery system, close emergency valve on the connection assembly, purge from the connection assembly, disconnect from flange, arm automatically retracts away from receiving vessel, purge delivery system, and the like. In the event that normal procedures and emergency shutdown fail or fail to act in time, assume pumps are operating at maximum flow, ERC activates, ERC Valves close, ERC clamp is released, liquid between valves in the ERC is lost, and water curtain on the connector assembly automatically activates. Table 1 depicts events and response of the system to the events.

TABLE 1

| Event | Response/Mitigation |
|---|---|
| Loss of Containment (Leak, Rupture) | |
| What if motion compensation fails during an active connection? (i.e. manual control of the system is available, but there is a partial or complete failure in the automated motion control system) What if all control of the arm is lost? | Motion compensation is accomplished through three independent systems (pedestal, main arm, secondary arm). If any one of these systems fails, an emergency shutdown may be initiated. Depending on the nature of the failure and/or the relative motion of the ships at the time of the failure, the emergency breakaway system may activate. Once disconnection is made, the bunker arm may move the bunker vessel away from the receiving vessel and ERC may automatically activate. |

In an embodiment of the present disclosure, there are two failure categories i.e., loss of control (failure of the motion control system) and loss of containment (pipe leak/rupture, hose leak/rupture). For example, the loss of control failure may include mechanical failure, sensor failure, controller/software failure, such as connection, hardware, bug, hack, and the like. In an exemplary embodiment of the present disclosure, the loss of containment may include deck pipe (leak, rupture), prep room, supply hose/pedestal, primary boom arm, secondary boom arm, the connection assembly, one or more modes of loss of control may potentially lead to loss of containment, such as boom slams into the receiving vessel and severs the supply pipe or hose. Further, additional mitigations to consider incorporating may include water spray and dry chemical in the pedestal, water spray and dry chemical in the bunker supply preparation room, water spray and dry chemical in the garage, water spray on exterior of pedestal, bunker supply prep room, HPU, and the emergency battery enclosure. In an exemplary embodiment of the present disclosure, the safety barriers may include spill prevention barrier, immediate ignition barrier, dispersion prevention barrier, delayed ignition barrier, and the like. The spill prevention barrier provided by the bunker arm's gas detector provides redundancy with the receiving vessel's bunker station gas detector. That is, if the gas detector on the connection assembly fails, the gas detector on the receiving vessel may activate the linked ESD systems. The dispersion prevention barriers provided by the bunker arm have an overlapping coverage (i.e. redundancy) with the receiving vessel's water spray system in the bunker station.

Various embodiments of the present disclosure provide the ammonia bunker delivery system 102 for transferring of ammonia bunker fuel. In an embodiment of the present disclosure, the ammonia bunker delivery system 102 enables the safe and expedient transfer of ammonia bunker fuel from one ship to another. Further, the ammonia bunker delivery system 102 minimizes risk to the crews and expedite bunkering. The ammonia bunker delivery system 102 is designed to be able to perform the entire bunkering procedure automatically, with human supervision and control happening in a safe and secure location. For example, ship's bridge or a dedicated control room. In addition to preparing the bunker station 158 to receive fuel (e.g. removing the bunker flange blank), the ammonia bunker delivery system 102 allows the crew to monitor the bunkering operation from a safe location.

Further, the ammonia bunker delivery system 102 expedites bunkering and enable automation by compensating for a wide range of relative motions between the bunkering vessel and the receiving vessel 106. When installed on a vessel with dynamic positioning capability, the ammonia bunker delivery system 102 allows for bunkering to take place without the need for auxiliary tender vessels, fenders, or lines securing the vessels to each other.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

I claim:

1. An ammonia bunker delivery system for transferring of ammonia bunker fuel, the ammonia bunker delivery system comprising:

a) a primary bunker arm configured to physically support a fluid delivery system across a first distance between a bunker vessel and a receiving vessel, wherein the primary bunker arm facilitates a first relative motion between the bunker vessel and the receiving vessel, and wherein the primary bunker arm comprises:

i) a pedestal configured to provide a plurality of motions via a set of hydraulic actuators, wherein the pedestal is sized to physically support static and dynamic loads from a rest of the ammonia bunker delivery system;

ii) a knuckle boom attached to an end of a main boom via a pivot joint that facilitates free rotation on a vertical plane, wherein the set of hydraulic actuators are used to rotate the knuckle boom around an axis of the pivot joint connection with a main boom;

b) a secondary bunker arm configured to physically support the fluid delivery system to facilitates a second relative motion between the bunker vessel and the receiving vessel, wherein the secondary bunker arm is configured to make a physical connection to a bunker flange of the receiving vessel, and wherein the secondary bunker arm comprises:

i) a manipulator arm configured to be used in an outdoor and marine environment, wherein the manipulator arm corresponds to a standard 6-axis industrial robotic arm;

ii) a tool interface attached to a wrist end of the manipulator arm via a plurality of bolts, wherein the tool interface is configured to provide a mechanical connection to a connection assembly;

c) a motion control system configured to coordinate movements of the primary bunker arm and the secondary bunker arm, wherein the motion control system comprises:

i) a connection sensor array comprising two sets of sensors mounted on opposite sides of each other at a hose-end of the connection assembly, wherein the two sets of sensors are configured to determine a precise position of the bunker flange relative to the connection assembly, and wherein the two sets of sensors are connected to motion controllers via a set of fiber optic cables;

ii) a primary motion controller comprising a set of computers configured to model an environment associated with the bunker vessel, the bunker delivery system, and the receiving vessel based on sensor input captured by a plurality of sensor arrays and the determined precise position, wherein the primary controller is configured to determine an optimal position a set of elements of the ammonia bunker delivery system, and send signals to all actuators of the ammonia bunker delivery system for moving the set of elements based on a result of modeling the environment; and d) a fluid control system configured to contain and control a flow of ammonia bunker fuel from the bunker vessel to the receiving vessel, wherein the fluid control system comprises a connection assembly configured to make a final connection between the ammonia bunker delivery system and the bunker flange of the receiving vessel based on the sensor input.

2. The ammonia bunker delivery system of claim 1, wherein the first distance is more as compared to the second distance, wherein the first relative motion facilitates majority of the motion between the bunker vessel and the receiving vessel, and wherein the second relative motion facilitates a remaining motion between the bunker vessel and the receiving vessel.

3. The ammonia bunker delivery system of claim 1, wherein the pedestal is made of steel and is securely attached to a deck structure of the bunkering vessel, and wherein the plurality of motions corresponds to a 3-axis motion compensation comprising rill, pitch and heave.

4. The ammonia bunker delivery system of claim 1, wherein the primary bunker arm comprises a Hydraulic Power Unit (HPU) securely attached to a deck structure of the bunkering vessel adjacent to the pedestal, wherein the HPU uses a marine-grade material and is configured to supply hydraulic power to the primary bunker arm, and wherein the HPU is driven by a set of electric pumps, and wherein the set of electric pumps receive power from a grid of the bunker vessel and backed-up by a set of emergency batteries associated with a safety system.

5. The ammonia bunker delivery system of claim 1, wherein the primary bunker arm comprises the main boom attached to the pedestal via a joint point that facilitates free rotation on a vertical plane, wherein the main boom is made of steel, and wherein the set of hydraulic actuators are used to rotate the main boom around an axis of a pivot joint connection with the pedestal.

6. The ammonia bunker delivery system of claim 1, wherein the primary bunker arm comprises a primary wrist attached to an end of the knuckle boom via a pivot joint that facilitates a free rotation on the vertical plane, wherein the set of hydraulic actuators are used to rotate the primary wrist around the axis of the pivot joint connection with the knuckle boom, and wherein the primary wrist corresponds to a short boom segment configured to orient a secondary arm interface.

7. The ammonia bunker delivery system of claim 1, wherein the primary bunker arm comprises a secondary arm interface attached to an end of a primary wrist via the plurality of bolts, and wherein the secondary arm interface provides mechanical, electrical, and hydraulic connections to the secondary bunker arm.

8. The ammonia bunker delivery system of claim 1, the primary motion controller is physically located on the bridge of the bunker vessel, wherein the motion control system comprises a secondary motion controller configured to serves as a backup to the primary motion controller, and wherein the second motion controller is physically located in a garage.

9. The ammonia bunker delivery system of claim 1, wherein the fluid control system includes a plurality of pipes, a set of hoses, a plurality of valves, a plurality of pumps that connect the bunker vessel's cargo manifold to a receiving ship's bunker flange, and wherein the ammonia bunker delivery system is designed to operate downstream of the bunker vessel's cargo manifold for allowing the bunker delivery system to leverage existing capabilities of an ammonia carrier with respect to cargo transfer.

10. The ammonia bunker delivery system of claim 1, further comprising a safety system configured to augment the safety features built into other systems and provide an active mitigation in the event of ammonia release, and wherein the safety system comprises a connection water nozzle which is a remotely operated, variable jet nozzle capable of creating a wide mist curtain or directed stream of water, wherein in an event of emergency release or upon detection of unsafe levels of ammonia, the mist curtain mode is automatically activated, and wherein water is supplied via a hose and pipe systems running parallel to the hoses and piping of the fluid control system.

11. The ammonia bunker delivery system of claim 1, further comprises a connection water spray system and a connection fire suppression system integrated into the connection assembly for providing additional safety measures at the point of connection.

12. The ammonia bunker delivery system of claim 1, further comprises a siphon drain configured to reduce the time to execute a safe disconnection and reduces the coordination with and workload of the receiving vessel's crew.

13. The ammonia bunker delivery system of claim 1, further comprising a garage to provides a sheltered space for storing and maintaining the secondary bunker arm and connection assemblies when not in use.

14. The ammonia bunker delivery system of claim 13, wherein a set of sliding doors at the forward end of the garage is open to allow the secondary bunker arm and attached connection assembly to be positioned inside the garage, wherein when the set of sliding doors are closed, the set of sliding doors provide a weather-tight seal at the primary wrist of the bunker arm, and wherein a maintenance is performed on the secondary bunker arm and the connection assembly without the requirement to remove the secondary bunker arm and the connection assembly from the primary bunker arm.

15. The ammonia bunker delivery system of claim 1, wherein motion control system includes the plurality of sensor arrays positioned on the bunker vessel and the bunker arm configured to create a detailed and real-time digital model of a physical environment inclusive of the bunker vessel, the ammonia bunker delivery system, and the receiving vessel, and wherein a set of programs use the created detailed and real-time digital model to orchestrate a movement of the primary bunker arm and the secondary bunker arm to reduce a relative motion between the connection assembly and the bunker flange to within 5 mm.

16. The ammonia bunker delivery system of claim 15, wherein the plurality of sensor arrays comprises a forward sensor array, an aft sensor array, the primary arm sensor array, and a connection sensor array, wherein the forward sensor array comprises a set of sensors mounted on a mast that is attached to a deck structure of the bunker vessel 30 m forward of the bunker arm pedestal, wherein the set of sensors are connected to the motion controllers via fiber optic cables, and wherein the set of sensors comprise cameras, radar, and LIDAR.

17. The ammonia bunker delivery system of claim 16, wherein the aft sensor array comprises the set of sensors mounted on a mast that is attached to the deck structure of the bunker vessel 30 m aft of the bunker arm pedestal, wherein the set of sensors are connected to the motion controllers via the fiber optic cables, and wherein the primary arm sensor array comprises the set of sensors mounted on a short base that is attached to the end of the main boom above the pivot joint, and wherein the set of sensors are connected to the motion controllers via the fiber optic cables.

18. The ammonia bunker delivery system of claim 1, wherein the fluid control system comprises a bunker delivery manifold, a deck supply pipe, one or more booster pumps, a bunker supply preparation room, a supply hose segment, a boom supply pipe, a connection hose management and the connection assembly, wherein the bunker delivery manifold is a steel pipe and valve assembly designed as an additional attachment to the bunker vessel's existing cargo manifold, wherein the bunker delivery manifold is attached to each of the bunker vessel's cargo manifold flanges via the set of bolts, and wherein a valve at each cargo flange connection routes the fluid into one of the ammonia bunker delivery system or straight through to a secondary cargo flange.

19. The ammonia bunker delivery system of claim 18, wherein the deck supply pipe is a double-walled steel pipe connecting the bunker delivery manifold to the one or more booster pumps, wherein the pipe is sized to support the maximum bunkering rate of prospective receiving vessels, wherein the one or more booster pumps are provided to augment the bunker vessel's cargo pumps as required, and wherein the one or more booster pumps is sized to support the maximum bunkering rate of prospective receiving vessels.

20. The ammonia bunker delivery system of claim 18, wherein the bunker supply preparation room provides an enclosed space for housing and maintaining the one or more booster pumps and an additional equipment, wherein the additional equipment comprises emergency shutoff valves, mass flowmeters, and sampling valves, wherein the design and safety features for the enclosed space are similar to features of fuel preparation rooms for ammonia-fueled vessels, wherein the supply hose segment is a flexible length of hose connecting a rigid piping inside the bunker supply preparation room with the ship-end of a boom supply pipe located at the top of the pedestal, and wherein the hose is flexible to accommodate the relative motion between the pedestal and the equipment fixed to the deck structure of the bunker vessel.

21. The ammonia bunker delivery system of claim 18, wherein the boom supply pipe is a double-walled steel pipe connecting the supply hose segment to the connection hose segment, wherein the boom supply pipe is physically supported by the main boom and the knuckle boom structures, wherein a set of swivel joints are located at pivot points on the bunker arm to facilitate the boom supply pipe to articulate with the bunker arm's movement, wherein the connection hose segment is a flexible length of hose connecting the boom-end of the boom supply pipe with the connection assembly, and wherein the hose is flexible to accommodate the full range of motion of the secondary bunker arm.

22. The ammonia bunker delivery system of claim 18, wherein the connection assembly of a set of sizes is available and is fitted based on the receiving vessel's specifications, wherein the connection assembly comprises an adapter, an Emergency Release Coupling (ERC), a mass flowmeter, and a hydraulic QC/DC, wherein the adapter adapts a size of the connection hose segment to the size of the bunker flange, wherein the ERC coupling is calibrated to automatically separate when allowable stress is exceeded and cutting off fluid flow on both sides of the coupling, wherein the mass flowmeter is for accurate measurement of the quantity of fuel delivered, and wherein the hydraulically powered dry quick connect/disconnect is for making a secure and remotely activated connection to the bunker flange.

* * * * *